Aug. 8, 1933.   G. WILCOX   1,921,276
PEACH PITTING MACHINE
Filed Feb. 26, 1929   6 Sheets-Sheet 1

Inventor
GEORGE WILCOX
By
Attorney

Aug. 8, 1933.  G. WILCOX  1,921,276
PEACH PITTING MACHINE
Filed Feb. 26, 1929  6 Sheets-Sheet 2

Inventor
GEORGE WILCOX
Attorney

Patented Aug. 8, 1933

1,921,276

UNITED STATES PATENT OFFICE 1,921,276

PEACH PITTING MACHINE

George Wilcox, Riverside, Calif., assignor to California Canning Machinery Company, a Corporation of California Application February 26, 1929. Serial No. 342,702

35 Claims. (Cl. 146—28)

This invention relates to a device of the character disclosed in my Patent No. 1,488,082 which was issued on March 25, 1924, and in my copending application Serial No. 719,502 which was filed on June 12, 1924, and is more particularly directed to improvements in pitting machines of the class disclosed in these two applications which will increase the operating efficiency and the structural compactness of machines of this character.

Machines of the class described are adapted for use in removing the pits or stones from drupaceous fruits, being especially useful in the removal of stones or pits from fruits such as plums or clingstone peaches in which the meat adheres closely to the pit.

In ordinary practice the pits are removed from fruit of this character either manually or mechanically by means of especially constructed knives and a great deal of the meat is cut from the fruit during such removal. In the machines of the class which I have developed, the pit is extracted by means of two flexible wires or cables which are guided through the fruit by an especially constructed incisor element. Toggle arms are used to draw these wires thru the fruit and it will be understood that these wires pass through the fruit close to the seed, completely separating the meat therefrom.

It has been found in the development of the machines of this character that the flexible severing members have a tendency to engage the projections of the pit and may through such engagement, break parts of the pit off, in the fruit, or they may be halted in their progress through the fruit by these projections thus slowing down the operation of the machine. This invention is therefore directed particularly to improvements in machines of this character which include guide means for protecting the pit from the severing wires.

Another improvement which is embodied in this invention comprises a new form of pitting center construction which is so constructed as to be automatically released for action when a fruit is properly positioned thereon. This improvement includes novel means whereby motion is transmitted to the pitting center or the impaling element and adds materially to the safety with which the machine may be operated.

It is a further object of this invention to produce a pitting machine having improved wire guiding plates, these plates being flexible and resiliently held in place to permit their transverse expansion and longitudinal movement during the passage of the wires over the pit.

This invention also includes an improved tipping blade which automatically removes a forward or tip end of the fruit during the initiation of the severing operation.

It is also an object of this invention to develop in connection with a pitting machine of this character, an improved pit ejecting member which is simple in its construction and positive in its operation.

Due to the fact that it is frequently desirable to have a record of the amount of fruit which passes through a machine of this character especially in the event the machines are used in a large industry such as the canning industry, it is a further feature of this invention to produce indicating or counting means which will keep an accurate record of the amount of fruit which passes through the machine.

Another object attending the production of this improved machine is to increase the safety and rapidity with which machines of the character may be operated by providing an improved tripping mechanism of novel character which requires the use of two hands for manipulation, and is at the same time positive and efficient in its operation.

This invention also embodies certain improvements in the carriage and the wire advancing means which make the organization more compact and simple in its construction and includes means governed by the amount of wire upon a magazine spool for controlling the quantity of wire advanced for each severing operation.

The further details in the construction of preferred forms of my invention together with other objects attending its production will be better understood from the following descriptions of the accompanying drawings which are chosen for illustrative purposes only and in which.

The general construction of a machine embodying my invention consists of a frame or supporting structure 11 which supports a reciprocating carriage indicated by reference numeral 12 and has fixed thereon an incisor frame 13 which in turn supports an incisor element 14. A pitting center or impaling organization generally indicated by reference numeral 15, which is supported by and is reciprocable relative to the carriage 12, is adapted to impale a fruit 16 upon the incisor element 14.

A pair of toggle arms 17 and 18 are pivotally mounted upon the carriage and are adapted to support flexible severing elements in the form of wires or cables indicated by reference numeral 19. The severing members 19 are adapted to be retracted by means of the toggle arms 17 and 18, rearwardly through the fruit and to effect by such movement a complete separation of the pit from the meat of the fruit.

In order that the wires 19 will not receive a undue wear at any one point due to a continuous cutting operation, means for imparting progressive linear advance to these wires, with the operation of the machine are illustrated as being mounted upon the carriage and are generally indicated by reference numeral 20. This last mentioned organization will, for the purpose of description, be designated as a wire advancing organization, the details of which will be more fully described later in the specification.

Reciprocation is imparted to the carriage 12 by means of a lever or arm 21, the inner end of which is pivoted to the mentioned carriage and the outer end of which is pivotally connected with a crank 22 which is adapted to receive rotation through the clutch member indicated at 23, from a drive shaft 24 which is rotatably mounted within suitable bearings formed in a standard 25 mounted upon the frame 11. The shaft 24 may receive rotation from any suitable power device not shown. A clutch operating device or trip member is generally indicated as 26 and will be more fully described later in the specifications.

A counting device 27 is illustrated as being forwardly mounted upon the incisor frame 13 and as will be explained later, this counting device is operated by means of an engagement finger 28 mounted upon the counter in cooperative relation with an oppositely disposed finger 29 which is adapted to swing about an offset center during the movement of a tipping blade indicated at 30.

Figures 1, 16, 17, 18, 19:
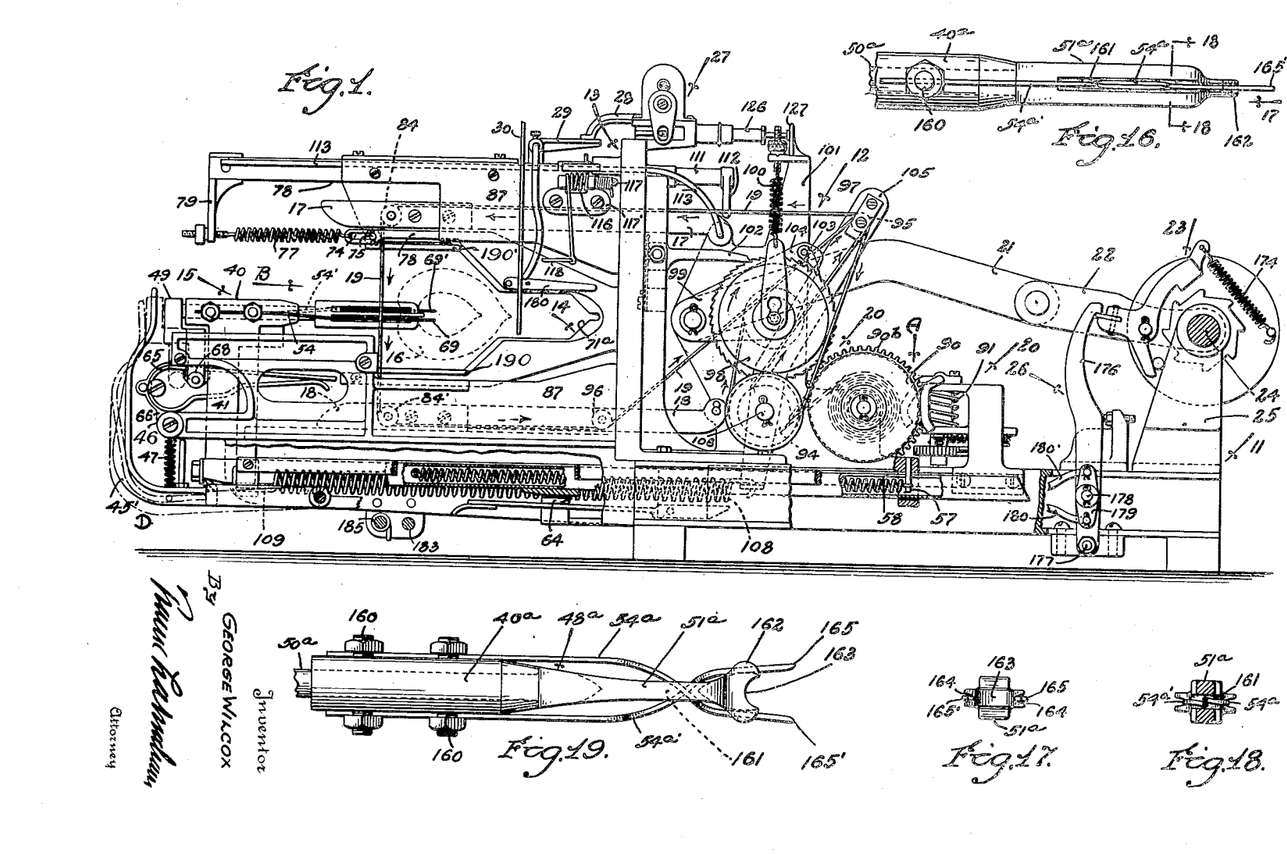
Fig. 1 is an elevational view having parts broken away to show various novel features of the invention.
Fig. 16 is an elevational view of a modified form of pit impaling element.
Fig. 17 is an elevational view taken substantially in the direction of the arrow 17 in Fig. 16.
Fig. 18 is a sectional elevation taken substantially in a plane represented by the line 18—18 in Fig. 16.
Fig. 19 is a plan view of the impaling element shown in Fig. 16.

In the operation of this invention, the impaling element 15 is adapted to force a fruit 16 into engagement with the tipping blade 30 after which the clutch organization 26 is manually released for engagement, such release being effective to cut the tip from the fruit and retract the carriage 12 in fruit impaling direction as indicated by the arrow B in Fig. 1. This movement of the carriage is effective to force the fruit into engagement with the incisor element which partially severs the meat and the continued advance of the carriage carries the wires 19 through the fruit and about the pit therein being effective to completely separate the meat from the pit after which the meat is forced from the incisor element in the manner as will be later described.

The return of the carriage is effective to bring the pit ejecting member into operation, thus removing the pit from the incisor element leaving the machine in a condition for the reception of another fruit. The return movement of the carriage is also effective to return the impaling member 15 to its normal position in which position it is latched as will be hereinafter described.

The unlatching operation of the impaling element is dependent upon the placement of a fruit upon this element in a position such that the seam of the fruit is in a plane substantially parallel with the plane of the incisor element through which the severing members 19 travel.

The construction and operation of the impaling element 15 will perhaps be best understood from Figs. 3 to 9 inclusive in which it is illustrated as embodying what may be termed a centering head 40 which includes a standard 41 rigidly mounted upon a thrust member illustrated as comprising a tube 42.

The lower end of the standard 41 is provided with a notch and shoulder indicated at 43 which is adapted to be engaged by a suitable projection 44 upon a latching stirrup 45 pivotally mounted between longitudinal members 46 of the frame. The latching stirrup 45 is adapted to cooperate with a spring 47 interposed between an extending arm 45' of the stirrup 45 and a fixed member 46' in the frame, to comprise a latch organization adapted to hold the impaling element 12 in a retracted position as illustrated in dot and dash lines in Fig. 5 and in full lines in Fig 1.

A pitting center 48 is reciprocably mounted within a longitudinal passage formed in the center head 40 and embodies an outer engagement member 49, a central rod member 50 and a pit finding member 51. The pit finding member 51 which is best illustrated in Fig. 7, is provided with a pit engaging forked head 52 and with longitudinal recesses 53 adapted to receive oppositely disposed resilient guiding members 54 and 54' which are adjustably mounted upon opposite longitudinal faces of the center head 40.

Figure 7:
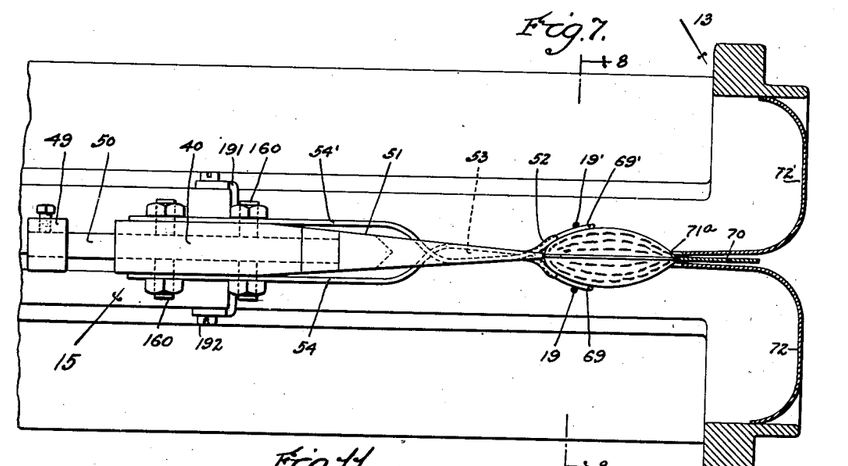
Fig. 7 is an enlarged partial plan section taken substantially along the line 7—7 of Fig. 5 and illustrating the construction of a pitting center head and the incisor blades.
Figures 8, 9, 10, 11, 12:
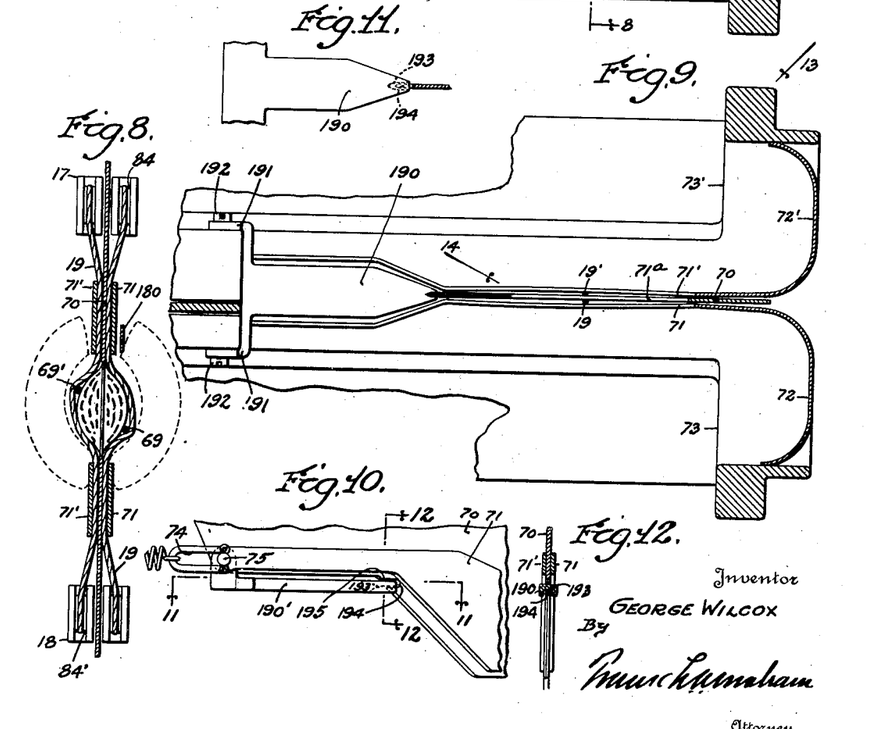
Fig. 8 is an enlarged elevational section showing the central portion of Fig. 6 and may be considered as having been taken in the plane represented by the line 8—8 in Fig. 7.
Fig. 9 is a plan section taken substantially in the plane represented by the line 9—9 in Fig. 5.
Fig. 10 is a fragmental elevational view showing the upper portion of an incisor element.
Fig. 11 is a plan section taken substantially in a plane represented by the line 11—11 in Fig. 10.
Fig. 12 is an elevational section taken substantially in a plane represented by the line 12—12 in Fig. 10.

As is best shown in Fig. 7 the pit engaging ends 69 and 69' of the wires 54 and 54' are so bent as to permit the reception of the pit only when the pit is held with the seam in a plane which is substantially parallel with the plane of the incisor element 14. It will therefore be evident that with this construction the center head is tripped by a forward movement of the pit to a point at which the latch arm 45' is moved into the dot and dash line position shown at D in Fig. 1, which can be effected only when the guide wires 54 and 54' are positioned to slide by the sides of the pit as indicated in Fig. 7. The movement of the central rod member 50 to the position D shown in Fig. 1, resulting from the forward thrust of a pit against the forked head 52 is effective to move the pitting center element 48 to a joint where the engaging member 49 forces the upper end of the latch arm 45' forward to a position at which the engaging finger 44 releases the latching shoulder 43 at the lower end of the standard 41, permitting the centering element to carry the fruit rearward to the position shown in Fig. 3.

For the purpose of furthering the advance of the centering element 40, a resilient member in the form of a coil spring 55 is illustrated as being enclosed within the tube 42. The forward end of the tube 42 is rigidly secured to the spring by any suitable means such as the cross pin 56, the rear end of the spring being attached to the carriage 12 by means of a downwardly projecting standard 57 which is adapted to reciprocate relative to the tube 42 in a suitably formed notch or recess 58.

Figure 4:
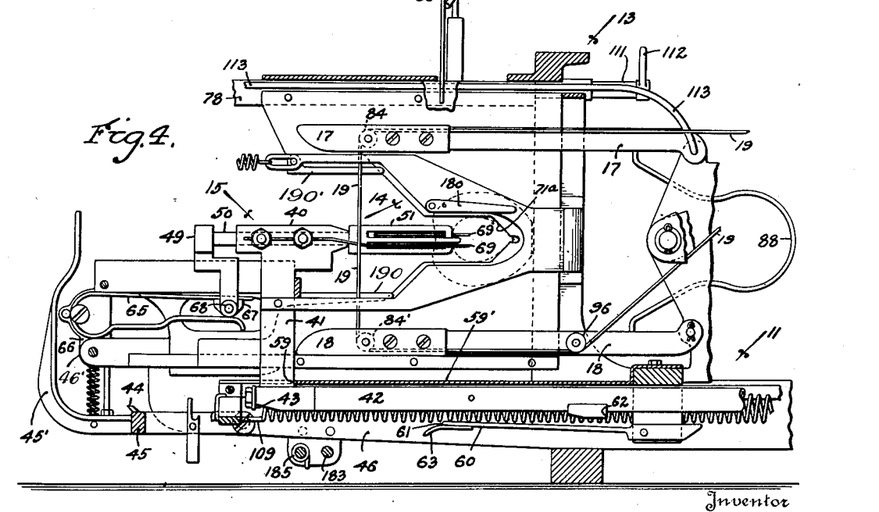
Fig. 4 is a sectional elevation similar to Fig. 3 and showing a further step in the operation of severing a fruit.

The rearward movement of the carriage 12 imparts movement to the pitting center organization 15 through the medium of spring 55 to a point at which the standard 41 engages at shoulder 59 formed by the edge of a transverse plate member 59' as shown in Fig. 4. Further movement of the carriage from this point on tends to expand the spring 55 and to increase the tension therein. When the carriage has been advanced to the extreme rear position and starts on its forward movement, this tension in the spring tends to initiate this movement of the carriage after which the forward movement of the carriage is continued, through operation of the crank arm 22. An engagement finger 60 pivotally mounted in any suitable manner upon the carriage and provided with a forward engaging shoulder 61, is brought into contact with a suitably formed shoulder 62, mounted upon the lower surface of the thrust member or tube 42 as shown in full lines in Fig. 5. This engagement and the subsequent movement of the carriage is effective to move the pitting center organization 15 to the position shown in dot and dash lines in Fig. 5 at which point a downwardly extending cam finger 63 formed on the forward end of the engaging finger 60 is adapted to force the finger downwardly through engagement of the finger 63 with a fixed cam finger 64, thus releasing incisor head from the forward moving carriage and permitting the incisor head 15 to be latched in the position shown in dot and dash lines in Fig. 5.

Figure 5:
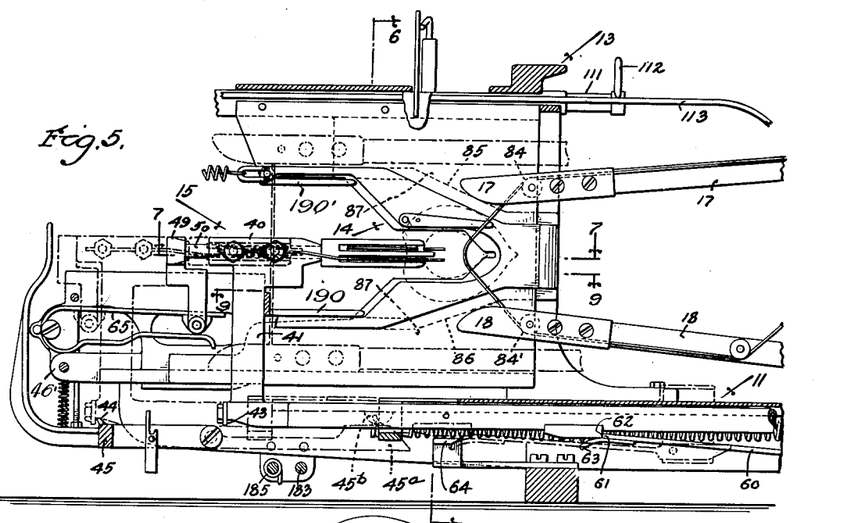
Fig. 5 is an elevational view similar to Figs. 3 and 4 showing the relative position of parts after a fruit has been severed and indicating in dot and dash lines the manner in which the pitting center head or impaling element is returned to and retained in its normal position.

It will be noted in the dot and dash line position of the construction shown in Fig. 5 that one side of the stirrup is provided with a rearwardly extending cam finger 45A, the upper surface of which is adapted to be engaged by a suitable lug such as the screw head 45b on the lower surface of the carriage. The cam finger 45a and the lub and screw head 45b are so positioned as to be in engagement when the thrust finger 60 is disengaged from the shoulder 62. It will also be apparent from the dot and dash line position of the parts shown in Fig. 5 that the finger 45A and the lug 45B hold the stirrup 45 and lug 44 firm in engagement with the shoulder 43 on the lower surface of the carriage retracting tube 42. This construction insures a positive latching action between the shoulder 43 and the stirrup 45 during each reciprocation of the carriage.

In order that the pitting center 48 in the incisor head 15 may be retarded relative to the standard 41 and the wires 54 and 54' a resilient frictional organization in the form of a substantially U-shaped spring 65 is mounted in an auxiliary frame or standard 66. This spring is adapted to engage a cam member or pivoted lug 67 mounted in any suitable manner upon a downwardly extending projection 68 formed upon the engagement member 49.

It will be understood that this retarding member tends to hold the pitting center 48 and pit finder 51 back during the retraction of the impaling element 15 thus permitting pit engaging ends 69 and 69' of the guide wires 54 and 54' to be advanced outwardly about the pit as shown in Fig. 4. This construction prevents the resilient severing wires 19 and 19' from coming into engagement with the pit until they have passed a central portion thereof, as is perhaps best illustrated in Figs. 7 and 8.

The incisor element 14 embodies a central incisor blade 70 and two oppositely disposed and substantially parallel guide plates 71 and 71', the incisor blade and each of the guide plates being provided with a central pit receiving recess indicated by reference numeral 71A. The guide plates 71 and 71' are in this improved form of my invention comprised of flexible metal sheets, the inner ends of which are bent on a curve substantially at right angles to the incisor blade as indicated at 72 and 72', the bent portions thereof being mounted in suitable recesses 73 and 73' formed in the incisor frame 13. This construction makes the plates yieldable under the action of cutting wires 19 and 19' during their passage about a fruit pit.

For the purpose of resiliently retaining the outer ends of the guide plates 71 and 71', these plates are outwardly provided with slots 74 which receive pins 75 suitably mounted upon an extending arm 78 formed on the incisor head 13 and slots 74 and pin 75 are held in cooperative engagement by means of the coil springs indicated at 77. The outer end of these coil springs are adjustably mounted in a downwardly extending finger or projection 79 mounted on the outer end of the arm 78. This construction tends to hold the outed ends of the guide plates in yieldable engagement with the incisor blade 70, and permits the plates to move in the event a pit or other object becomes wedged between one of the wires and the blade. This is a safety measure which greatly reduces the danger of breaking the wire in the event they are held by the incisor blade or a pit engaged therein.

Figures 2, 20, 21, 22, 23, 24:
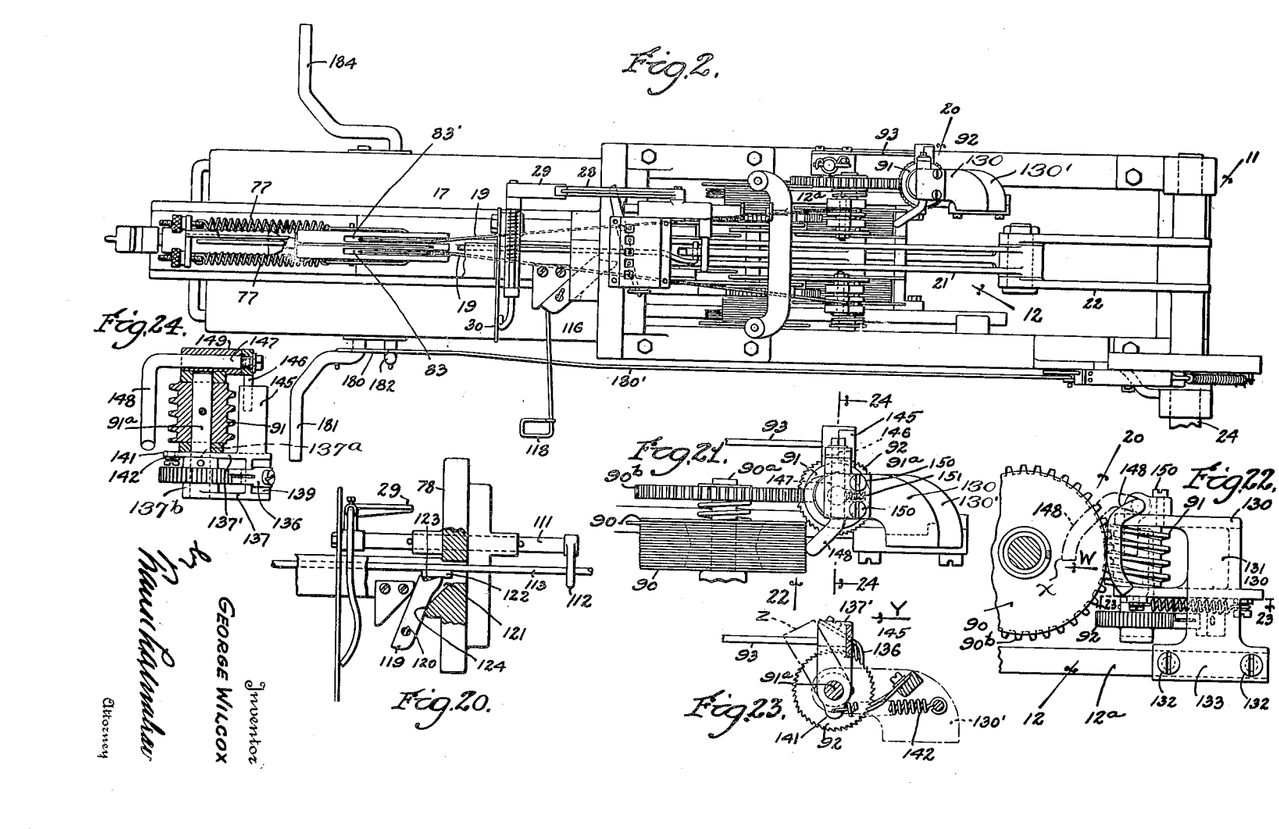
Fig. 2 is a plan view corresponding to the elevation shown in Fig. 1 and having parts broken away to show the incisor blade construction.
Fig. 20 is an enlarged fragmental plan view partially broken away and illustrating details in the construction of the tipping blade and pit ejecting organizations.
Fig. 21 is a partial plan view which may be considered as having been taken substantially in the direction of the arrow A in Fig. 1, and shows a preferred form of wire regulating organization.
Fig. 22 is an elevational view taken substantially in the direction of the arrow 22 in Fig. 21.
Fig. 23 is a plan section taken substantially in a plane represented by the line 23—23 in Fig. 22.
Fig. 24 is an elevational section taken substantially in a plane represented by the line 24—24 in Fig. 21.
Figure 3:
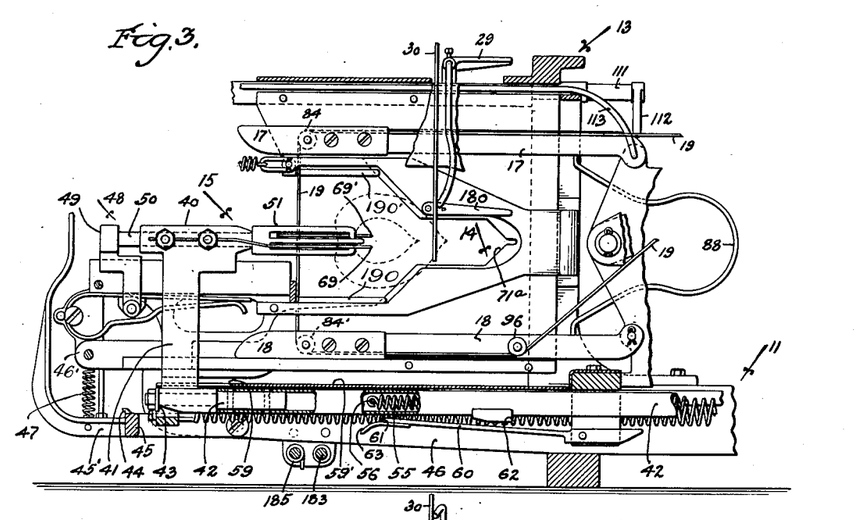
Fig. 3 is a partial enlarged sectional elevation showing details in the fruit pitting construction and indicating the position of the fruit in engagement with the tipping blade immediately before the operation of the machine is started.

As was previously mentioned, the severing wires 19 and 19' are adapted to receive transverse reciprocation relative to the incisor element 14 by means of toggle arms 17 and 18. These toggle arms are illustrated in Fig. 2 as being provided with notches or recesses 83 and 83' which may be internally provided with rollers or other suitable means 84 adapted to act as bearing elements for the severing wires 19. In order that the toggle arms 17 and 18 may be yieldably drawn toward one and another as illustrated in Fig. 4 and Fig. 5 during the passage of the wires 19 about the pit of a fruit, oppositely disposed and inwardly extending bearing flanges 85 and 86 (Fig. 5) are illustrated as being formed upon angularly extending plates 87 which are formed upon the incisor frame 13 on opposite sides of the incisor element and a resilient spring member 88 is interposed between the two inner ends of the toggle arms as illustrated in Fig. 3 to normally hold these arms in a distended relation with each other.

As was mentioned in connection with the disclosure in my copending application, it is preferable in the continued use of the machines of this nature to impart a slight linear advance to the wires during or after each cutting operation in order that they will not receive excessive wear at any one point, and the means of imparting such advance in combination with means for holding the wire taut during the operation of the machine are generally indicated by reference numeral 20. Such wire advancing and tightening means embody what may be termed a magazine reel 90, mounted on a shaft 90—A which carries a gear 90—B, which in turn is adapted to be engaged by a worm 91. The worm 91 is mounted upon a vertical shaft 91—A which is indirectly supported by the carriage 12 and the lower end of the shaft is provided with a ratchet wheel 92 which is indirectly adapted to be rotated by a fixed pawl 93 mounted upon the frame in a position at which it will cause the ratchet 92 to be rotated at the termination of a rearward movement of the carriage. This pawl and ratchet organization is perhaps best illustrated in Figs. 21 to 24 inclusive and the details in its construction and operation will be more fully described later in the specification.

The wire or cable coming from the magazine reel 90 passes over what may be termed a directing pulley or block 94 from which it is carried upward to a tightening block 95 and from thence passes to the recess 83 in the upper toggle arm 17 over the bearing element 84 therein and downward to the bearing element 84' in the toggle arm 18. From this point the wire is carried substantially horizontally to a secondary directing bearing element or block 96, from which it extends upwardly to a second directing bearing element 97 which is adjacent to the directing element 95 over and around which the wire is brought down to a section of block 94 and back to the take-up reel illustrated by reference numeral 98.

The take up reel 98 is rotatably mounted upon an arm 99 which is pivoted to the inner end of the carriage moving lever 21. The pivoted arm and take-up reel are constantly drawn to a yieldable wire tightening position by means such as the adjustable coil spring 100 which is supported in any suitable manner from an upwardly extending standard 101 mounted on the carriage 12. In order that the take-up reel may be effective to advance the cable or wire which is released by the rotation of the worm 91 through the organization described above, the outer periphery of the take-up reel 98 is provided with ratchet teeth which are adapted to be engaged by a fixed pawl 102, during the reciprocation of the carriage.

The take-up reels are held against return movement by means of a movable pawl 103 which is pivoted upon a suitably formed extension 104 embodied in the reel supporting lever arm 99.

The wire tightening blocks 95 and 97 are mounted in the upper end of an upwardly extending lever arm 105 which is illustrated as being pivoted upon a pivot pin 106 which also carries the directing block 94. This lever is yieldably held in a wire tightening position by means of a substantially horizontal spring 108, the outer end of which is illustrated as being secured to the frame or supporting structure 11 at 109.

It will be understood that the above described wire feeding construction with the exception of the worm 91 and the pawl organization for rotating the same indicated at 93 and 94 is duplicated on each side of the carriage, such duplication being necessary for the uniform linear advance of each of the severing wires 19.

Figure 6:
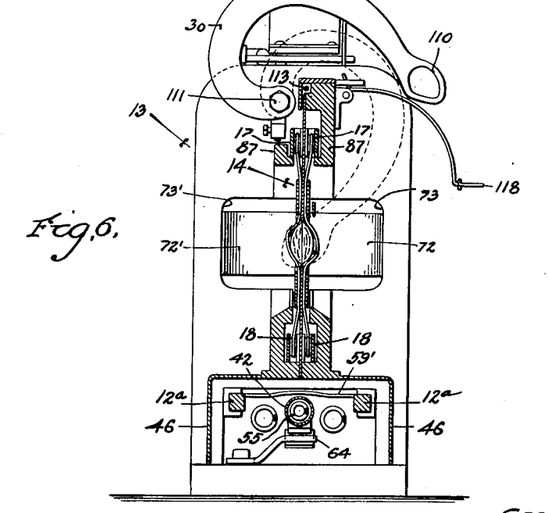
Fig. 6 is a sectional view taken substantially along the line 6—6 of Fig. 5 and illustrating more fully the construction and operation of the tipping element and the seed ejecting element.

The tipping blade 30 is perhaps best illustrated in Fig. 6 as comprising a curved plate member, the lower end of which is provided with a tipping aperture 110 and the upper end of which is illustrated as being mounted upon a rotatable shaft 111. The shaft 111, as is best illustrated in Figs. 1, 3 and 4 is provided with a cam member 112 which is adapted to receive rotation from what may be termed a cam rod 113 which is adapted to receive reciprocation from the carriage by having been mounted adjacent to the toggle arm 17.

It will be understood from Figs. 3 and 4 that the initial rearward movement of the carriage is effective to move the tipping blade 30 from the position indicated at Fig. 3 in which the tip of the fruit is engaged with the tipping aperture, to the position in Fig. 4, such movement being effective to remove the tip from the fruit.

The pit ejecting organization is illustrated as comprising a spiral spring 116 which is rotatably mounted upon a shaft illustrated at 117, the shaft 117 being supported by a suitable bearing bracket 117' mounted upon the extending arm 78 of the incisor frame. An outer end of the spring 116 is provided with a pit ejecting member 118 and rotation is imparted to the pit ejecting member by means of an organization which is best illustrated in Fig. 20. This organization embodies a slidable pawl 119 which receives an inner end 120 of the spring 116 and which is adapted to be slidably contained in a suitable recess 121, formed in the upper end of the frame 78. The cam rod 113 is adapted to reciprocate through this recess and that portion of the cam rod opposite the inner end of the pawl 119, when the carriage has reached a position just prior to the normal position, is provided with an outwardly extending lug or shoulder 122 which is adapted to engage a notch 123 formed upon the inner end of the pawl 119. The forward movement of the cam rod 113 and the consequent movement of the lug 122 after such an engagement is effective to rotate the pawl 119 about a bearing point 124, such rotation being effective to throw the pit engaging end 118 of the spring down to and in engagement with the pit which has been retained in the recess 71—A which is formed in the incisor element 14.

As was mentioned heretofore, this form of my invention is provided with a counting device indicated by reference numeral 27, which may be of any preferred type, and in connection with which novel operating means are provided in the form of a slidable releasing rod 126 which is adapted to be engaged by a suitable engagement member 127 formed upon the carriage supporting standard 101. It will be understood that the movement of this releasing rod acts to initiate a counting operation, the operation of the counter being completed by the upward movement of a lever 28 such movement being imparted to this lever by means of the arm 29 which is mounted upon the tipping blade supporting organization as previously described.

As was previously mentioned in the specification, it is one of the objects of this invention to develop a peach pitting machine which is provided with means for governing the amount of wire or cable fed from the magazine reel so that the quantity of wire released for each reciprocation of the machine is substantially uniform irrespective of the amount of wire upon the magazine reel.

It will be understood that when the reel is full its circumference is substantially three times the circumference of the reel when it is empty and for the same radial movement the quantity of wire released when the reel is full as would be substantially three times the quantity released when the reel is nearly empty.

I have therefore provided means regulated by the quantity of wire upon the reel whereby the reel is rotated a less distance when it is full than when it is empty; this construction is adapted to be uniformly operated during the depletion of the wire on the roll so that substantially the same amount of wire is released for each reciprocation of the machine during the entire life of the mentioned magazine reel.

The details of the mechanism by means of which it is accomplished are best illustrated in Figs. 21 to 24, inclusive, where it will be noted that the shaft 91—a which carries the worm 91 is supported by means of two substantially horizontal bearing plates 130 and 130' which are carried by a vertical standard 131, which in turn is mounted upon the guide rail 12—a carriage 12 by means such as the screws 132 extending through base plate 133.

As has been previously pointed out the lower end of the shaft 91—a carries the ratchet wheel 92 and both the ratchet wheel 92 and the worm 91 are rigidly secured to the shaft 91a. The ratchet wheel 92 is adapted to receive rotation from a racking pawl member 136 which is fixed to a suitable pawl arm 137, such arm being best illustrated in Fig. 24 as rotatably mounted upon the lower portion of the shaft 91a. In this particular form of the invention the pawl member comprises two oppositely disposed substantially horizontal plates 137 and 137' connected by a web 139 which carries the racking pawl 136. The inner ends of the arms 137 and 137' are provided with a bearing aperture 137a and a hub 137b to rotatably receive the shaft 91a and the upper plate 137' is provided with an extending finger 141 which receives a resilient member such as the coil spring 142. The coil spring 142 as is best illustrated in Fig. 23 has one end rigidly fixed to the lower horizontal bearing plate 130' and is so constructed as to at all times urge the pawl member in a non-rotative position relative to the ratchet wheel 92.

It will be understood, therefore, that when the pawl member 137 is carried to the extreme position indicated in the dot and dash line position Z in Fig. 23 that engagement of this member by the fixed pawl 93 is effective to rotate the ratchet wheel 92 through a maximum distance and that as the pawl member is moved toward the full line position indicated in Fig. 23, the amount of rotation which the ratchet wheel 92 receives is correspondingly decreased.

It will, therefore, be apparent that if means are provided for adjusting the position of the pawl member as mentioned above by the increasing or decreasing circumference of the magazine reel 90, the amount of rotation which the ratchet wheel 92 receives will correspondingly be decreased or increased as the case may be.

For the purpose of establishing this relation between the ratchet member 137 and the magazine reel 90, the ratchet member is provided with a standard 145 which extends upward from the outer end of the member 137 and is adapted to be engaged by an outwardly extending finger 146 formed on the outer end of a rotatable shaft 147, the inner end of which carries a reel engaging finger 148. This shaft 147 is rotatably mounted within a suitable bearing member 149 which is supported upon the upper bearing plate 130 by means such as screws 150. A friction adjustment is provided in the bearing plate 149, such an adjustment being in the form of adjustable coil spring 151 and effective to regulate to a certain extent the resistance of the shaft 147 to rotation.

It will be apparent from the illustration of this finger 148 and magazine reel 90 shown in Figs. 21 and 22 that the reel engaging finger 148 is constantly held in yieldable engagement with the reel 90 by means of the coil spring 142. This, of course, is due to the fact that the coil spring 142 is constantly urging the pawl member 137 in the direction of the arrow Y and the standard 145 on the pawl member therefore engages the downwardly extending finger 146 which results in a radial force being applied to the shaft 147 by this finger in the direction of the arrow Y, which in turn urges the lower end of the reel engaging finger 148 toward the reel 90. During the depletion of the roll, this movement will be carried to the extreme position indicated by the dot and dash lines at X in Fig. 22, and when in this position the pawl arm 137 will occupy the dot and dash line position indicated at Z in Fig. 23. It will thus be seen that as the quantity of wire or cable upon the magazine reel 90 is diminished the reel engaging finger 148 will travel in the direction of the arrow W and consequently the ratchet member will travel toward the position indicated at Z in Fig. 23. Therefore, each engagement of pawl member 137 with the fixed pawl 93 is effective to rotate the worm 91 a slightly greater distance than for the preceding engagement.

Figs. 16 to 19, inclusive, illustrated a preferred form of impaling element construction. In this form of the invention the center head section indicated at 40a, receives the slidable center rod 50a of the pitting center 48a; the outer end of the center rod supports the pit finder indicated by reference numeral 51a.

The guide wires 54a and 54a' are adjustably mounted upon opposite faces of the centering element by means of the bolts indicated at 160.

This form of the pitting center construction differs from that illustrated in Fig. 1 in that the guide wires 54a and 54a' are supported in the same horizontal plane and the pit finder shaft 51a is provided with a single longitudinal aperture 161, which is of sufficient width to permit the wires to cross within this aperture.

The outer end of the pit finder is formed with a pit engaging head 162 provided with a suitable recess 163 to admit the reception of the pit and the sides of this head member 162 are provided with the notches indicated at 164, which are positioned in substantially the same horizontal plane and are adapted to receive the outer ends 165 and 165' of the guide wires 54a and 54a'.

It has been previously mentioned as one of the objects of this invention to provide a clutch releasing device which is so constructed as to necessitate the use of both hands of an operator in disengaging clutch.

This invention embodies an improvement over the construction shown in my copending application Serial No. 719,502, in that it is impossible to disengage the clutch by an inadvertent jarring action or in any other manner except by the downward pressure upon two clutch levers at the same time.

Figure 13:
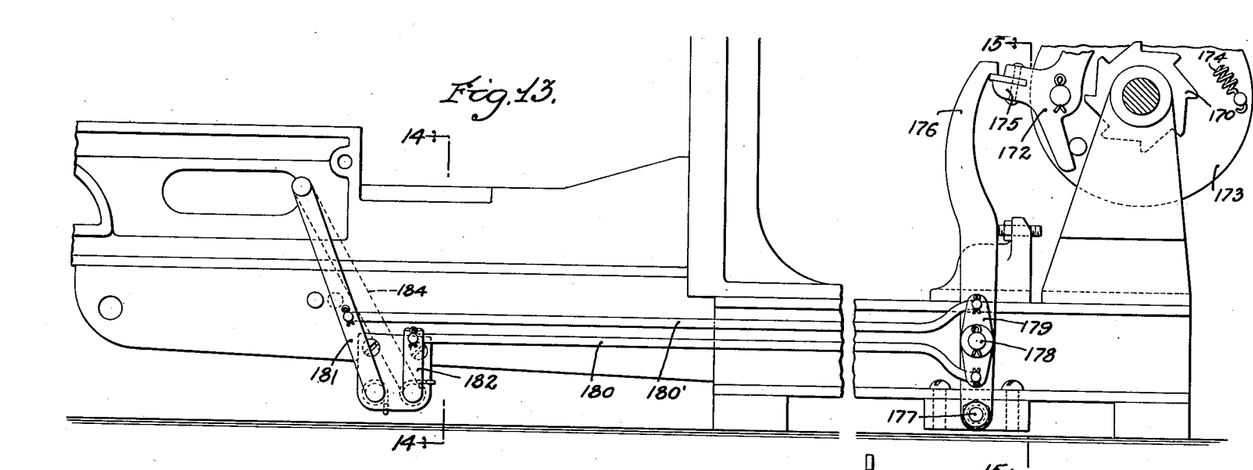
Fig. 13 is an enlarged elevational view showing the frame for an organization such as is shown in Fig. 1, and illustrating a preferred form of trip mechanism for controlling the clutch.
Figure 14:
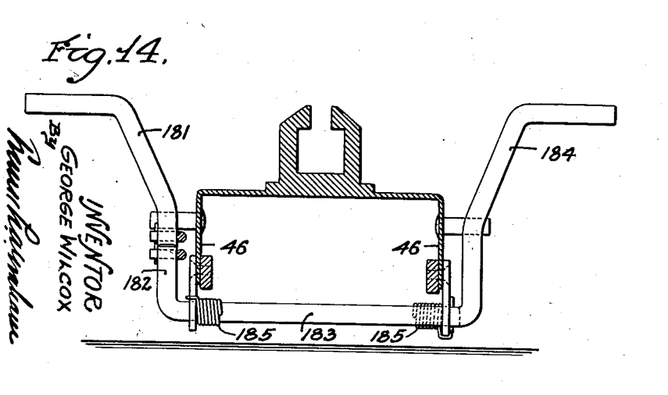
Fig. 14 is a sectional elevation taken substantially in a plane represented by the line 14—14 in Fig. 13.
Figure 15:
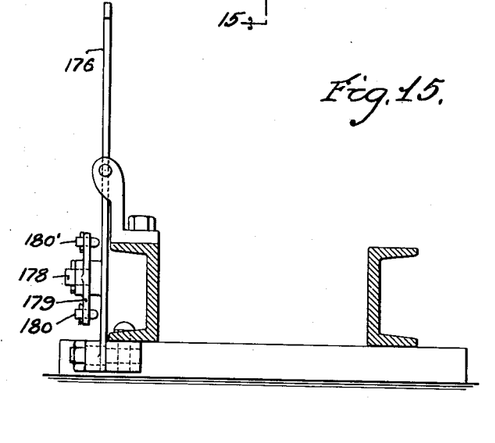
Fig. 15 is a sectional elevation taken substantially in a plane represented by the line 15—15 in Fig. 13.

This form of clutch operating organization is best illustrated in Figs. 13 to 15, inclusive, wherein it will be noted that the clutch member embodies a ratchet wheel 170 and a pawl member 172. The pawl member is mounted upon the clutch wheel 173 and is urged toward the ratchet wheel 170 by means of a coil spring 174. This ratchet member 172 is provided with an outwardly extending finger or arm 175 which is engaged by a substantially vertical trigger finger or lever 176 pivoted to the frame by means of a pivot pin 177. The trigger lever 176 is provided at an intermediate point with a secondary pivot pin 178, which supports a vertical "walking beam" 179. The opposite ends of the walking beam 179 receive control rods 180 and 180', which extends to the rear end of the frame where they are adapted to receive longitudinal movement from suitable control levers indicated at 181 and 182.

It will be noted from Figs. 13 and 14 that the upper end of the lever 181 is formed in a manner such that it may be conveniently engaged by an operator and the lever 182 is provided with a horizontal shaft 183 which extends transversely beneath the frame and the opposite end of which is provided with an operating handle 184, similar to the handle or lever 181 on the other side of the frame. Both the levers 181 and 182 are pivotally supported by the frame and are constantly urged toward a neutral position by means of the springs indicated at 185.

It will be understood from this construction that the movement of either one of the handles 181 or 184 individually is effective merely to oscillate the walking beam 179 and can not possibly effect a movement of the lever 176.

Figs. 1 and 9 to 12, inclusive, illustrate a preferred form of incisor blade construction such as is used in this improved embodiment of my invention.

In this construction it will be noted that the incisor blade embodies blade supporting heads or spacing plates indicated at 190 and 190'. Such plates being mounted upon the frame by means of suitably formed ears 191, which are secured to the frame by means of the screws 192. It will be noted in Fig. 1 that the incisor blade is substantially symmetrical and that both the upper and lower ends thereof are received by these spacer plates or heads 190.

The preferred manner in which the incisor blades are attached to the spacer plates, is perhaps best illustrated in Figs. 9 to 12, inclusive, wherein it will be noted that the outer end of each spacer plate 190 is provided with a suitable notch 193 and the incisor blade is also notched as indicated at 194. This notch has been adapted to receive the extending end 195 formed by the notch 193 in the plate 190. The blade and the plate after being so notched may be attached to each other by welding or in any other suitable manner, the union formed thereby being of a very substantial and rigid nature. It will be observed that the spacing plates 190 and 190' have a wide section, the end of which tapers to the incisor blade. This wide section acts as a guide for the flexible severing wires 19 and holds them apart to permit the free movement of the pitting center head when the severers are in a retracted position.

It has been found in the use of machines of this nature that after a fruit has been divided, the two halves have a tendency to remain upon the guide plates or the incisor element, this being caused by a slight suction created between half of the fruit and the blade. Although the fruit might not remain upon the incisor blade for any length of time, it is necessary in order that the pit ejector may operate efficiently to remove the severed half of the fruit immediately after it has been severed, and for this purpose the outer surface of the incisor element is provided with a suitable plate or finger indicated 180, as best illustrated in Figs. 1 to 5, inclusive.

It will be apparent from the foregoing description that this invention embodies an improved pitting machine, construction of which includes novel features for increasing the operating safety and efficiency and in which the elements thereof are so constructed and arranged as to increase the compactness of the unit and decrease the possibility of breakage in the individual parts. It will therefore be understood that while I have herein described and illustrated one complete embodiment of my invention, that the invention is not limited to the precise construction or combination of parts described and illustrated, but includes within its scope such changes or modifications as may fairly come within the spirit of the appended claims.

I claim as my invention:

1. In a pitting machine, the combination of: an incisor; a reciprocable pitting center head; a pitting center reciprocably mounted in said pitting center head and arranged to impale a fruit upon said incisor; means for holding said head in a retracted position and means operable by the engagement of a fruit pit with said pitting center for releasing said holding means.

2. In a pitting machine, the combination of: an incisor; a reciprocable pitting center head; a pitting center reciprocably mounted in said pitting center head and arranged to impale a fruit upon said incisor; means for holding said head in a retracted position, means operable by the engagement of a fruit pit with said pitting center for releasing said holding means, and means for imparting movement to said center head.

3. In a pitting machine the combination of: an incisor; a reciprocable pitting center head; a pitting center reciprocably mounted in said pitting center head and arranged to impale a fruit upon said incisor; means for holding said head in a retracted position, means operable by the engagement of a fruit pit with said pitting center for releasing said holding means, and guiding means mounted on said head.

4. In a pitting machine, the combination of: an incisor; a reciprocable pitting center head; a pitting center reciprocably mounted in said pitting center head and arranged to impale a fruit upon said incisor; means for holding said head in a retracted position, means operable by the engagement of a fruit pit with said pitting center for releasing said holding means and guiding means mounted on said head, said pitting center being movable relative to said guiding means.

5. In a pitting machine, the combination of: an incisor; a reciprocable pitting center head; a pitting center reciprocably mounted in said pitting center head and arranged to impale a fruit upon said incisor; means for holding said head in a retracted position, means operable by the engagement of a fruit pit with said pitting center for releasing said holding means and guiding means embodying longitudinally extending wires mounted on said head and adapted to be received by longitudinal recesses in said pitting center.

6. In a pitting machine, the combination of: an incisor; a reciprocable pitting center head; a pitting center reciprocably mounted in said pitting center head and arranged to impale a fruit upon said incisor; means for holding said head in a retracted position, means operable by the engagement of a fruit pit with said pitting center for releasing said holding means, and resilient means for imparting movement to said head.

7. In a pitting machine, the combination of: an incisor; a reciprocable pitting center head; a pitting center reciprocably mounted in said pitting center head and arranged to impale a fruit upon said incisor; means for holding said head in a retracted position, means operable by the engagement of a fruit pit with said pitting center for releasing said holding means; means for imparting movement to said head and frictional means for retarding the movement of said head.

8. In a pitting machine, the combination of: an incisor; a reciprocable pitting center head; a pitting center reciprocably mounted in said pitting center head and arranged to impale a fruit upon said incisor; means for holding said head in a retracted position; means operable by the engagement of a fruit pit with said pitting center for releasing said holding means; means for imparting movement to said head and frictional means for retarding the movement of said head comprising a resilient cam organization, one member of which is mounted on said head, another member of which is longitudinally fixed relative to said head.

9. In a pitting machine the combination of: an incisor embodying a central blade adapted to engage the pit of a fruit and lateral guide plates in yieldable engagement with said central blade; means for impaling a fruit on said incisor; and flexible severers movable transversely through said fruit, between said central blade and said guide plates.

10. In a pitting machine the combination of: an incisor embodying a central blade adapted to engage the pit of a fruit and lateral guide plates in yieldable engagement with said central blade; means for impaling a fruit on said incisor; and flexible severers movable transversely through said fruit, and between said central blade and said guide plates, said guide plates comprising flexible sheets, engaging ends of which are curved to produce a spring action and separate resilient means outwardly mounted on said guide plates.

11. In a pitting machine the combination of: an incisor embodying a central blade adapted to engage the pit of a fruit and lateral guide plates in yieldable engagement with said central blade; means for impaling a fruit on said incisor; and flexible severers movable transversely through said fruit, between said central blade and said incisor blades, said guide plates being outwardly supported by a pin extending through a slot; and separate resilient means holding said pin and said slot in cooperative engagement.

12. In a pitting machine the combination of: an incisor embodying a central blade adapted to engage the pit of a fruit and lateral guide plates in yieldable engagement with said central blade; means for impaling a fruit on said incisor; flexible severers movable transversely through said fruit, between said central blade and said guide plates, and resilient fingers mounted on said guide plates and adapted to force the halves of severed fruit therefrom.

13. For use in combination with a pitting machine having an incisor blade; a guide plate comprising a flexible sheet, provided with a pit receiving recess and having an outwardly curved inner end, and an outer end provided with a slot adapted to receive a fixed guide pin; and spring means adapted to yieldably hold said guide plate against longitudinal movement relative to said incisor blade.

14. For use in combination with a pitting machine having an incisor blade; an incisor blade comprising a flexible metal sheet, provided with a pit receiving recess and having an outwardly curved inner end and outer end thereof being provided with a slot adapted to receive a fixed guide pin; a spring adapted to hold yieldably said guide plate against longitudinal movement relative to said incisor blade; and a resilient finger mounted on said guide plate adjacent said recess to force the half of a severed fruit therefrom.

15. A machine for halving drupaceous fruit embodying: a supporting frame; an incisor head mounted on said supporting frame; an incisor mounted on said incisor head; a carriage reciprocably mounted in said supporting frame; a pitting center head mounted on said carriage and longitudinally movable relative thereto; a pitting center mounted in said center head, adapted to impale a fruit upon said incisor blades and resilient means for transmitting motion from said carriage to said pitting center head.

16. A machine for halving drupaceous fruits embodying: a supporting frame; an incisor head mounted on said supporting frame; an incisor mounted on said incisor head; a carriage reciprocably mounted in said supporting frame; a pitting center head mounted on said carriage and longitudinally movable relative thereto; a pitting center mounted in said center head, adapted to impale a fruit upon said incisor; resilient means for transmitting a rearward movement from said carriage to said pitting center head; and separate means for transmitting a forward movement from said carriage to said pitting center head.

17. A machine for halving drupaceous fruits embodying: a supporting frame; an incisor head mounted on said supporting frame; an incisor mounted on said incisor head; a carriage reciprocably mounted in said supporting frame; a pitting center head mounted on said carriage and longitudinally movable relative thereto; a pitting center mounted in said center head, adapted to impale a fruit upon said incisor; resilient means for transmitting a rearward movement from said carriage to said pitting center head; a separate means for transmitting a forward movement from said carriage to said pitting center head, and means for releasing said last mentioned means at a predetermined point.

18. A machine for halving drupaceous fruit embodying: a supporting frame; an incisor head mounted on said supporting frame; an incisor mounted on said incisor head; a carriage reciprocably mounted in said supporting frame; a pitting center head mounted on said carriage and longitudinally movable relative thereto; a pitting center mounted in said center head, adapted to impale a fruit upon said incisor; means for transmitting a rearward movement from said carriage to said pitting center head; and separate means for transmitting a forward movement from said carriage to said pitting center head comprising a thrust member mounted on said center head and a pivoted finger and a shoulder cooperatively mounted between said carriage and said thrust member.

19. A machine for halving drupaceous fruit embodying: a supporting frame; an incisor head mounted on said supporting frame; an incisor mounted on said incisor head; a carriage reciprocably mounted in said supporting frame; a pitting center head mounted on said carriage and longitudinally movable relative thereto; a pitting center mounted in said center head, adapted to impale a fruit upon said incisor blades; means for transmitting a rearward movement from said carriage to said pitting center head; and separate means for transmitting a forward movement from said carriage to said pitting center head comprising a thrust member mounted on said center head; a shoulder formed on said thrust member and a pivoted finger on said carriage adapted to engage said shoulder.

20. A machine for halving drupaceous fruit embodying: a supporting frame; an incisor head mounted on said supporting frame; an incisor mounted on said incisor head; a carriage reciprocably mounted in said supporting frame; a pitting center head mounted on said carriage and longitudinally movable relative thereto; a pitting center mounted in said center head, adapted to impale a fruit upon said incisor blades; means for transmitting a rearward movement from said carriage to said pitting center head; separate means for transmitting a forward movement from said carriage to said pitting center head comprising a thrust member mounted on said center head; a shoulder formed on said thrust member, a pivoted finger on said carriage, and means for holding said pivoted finger in engagement with said shoulder; and a fixed finger on said frame for disengaging said resilient finger from said shoulder at a predetermined point.

21. A machine for halving drupaceous fruit embodying: a supporting frame; an incisor head mounted on said supporting frame; an incisor mounted on said incisor head; a carriage reciprocably mounted in said supporting frame; a pitting center head mounted on said carriage and longitudinally movable relative thereto; a pitting center mounted in said center head, adapted to impale a fruit upon said incisor; means for transmitting a rearward movement from said carriage to said pitting center head; and separate means for transmitting a forward movement from said carriage to said pitting center head comprising a thrust member mounted on said center head; a shoulder formed on said thrust member and a pivoted finger on said carriage adapted to engage said shoulder, said thrust member being provided with a latching shoulder; and a latch member mounted in said frame and adapted to engage said last mentioned shoulder when said forward moving means are disengaged.

22. A machine for halving drupaceous fruit embodying: a supporting frame; an incisor head mounted on said supporting frame; an incisor mounted on said incisor head; a carriage reciprocably mounted in said supporting frame; a pitting center head mounted on said carriage and longitudinally movable relative thereto; a pitting center mounted in said center head, adapted to impale a fruit upon said incisor; means for transmitting a rearward movement from said carriage to said pitting center head; and separate means for transmitting a forward movement from said carriage to said pitting center head comprising a thrust member mounted on said center head; a shoulder formed on said thrust member and a pivoted finger on said carriage adapted to engage said shoulder, said thrust member being provided with a latching shoulder; a latch member mounted in said frame and adapted to engage said last mentioned shoulder when said forward moving means are disengaged and means operable by the forward movement of said pitting center for disengaging said latch member.

23. In a pitting machine the combination of: a supporting structure; an incisor mounted on said supporting structure; a carriage movably mounted on said supporting structure; a pitting center arranged to impale a fruit upon said incisor; oppositely disposed toggle arms pivotally mounted on said carriage in the plane of said incisor; said toggle arms being provided with slots adapted to receive flexible cutting members; flexible cutting members in said slots; and means for moving said flexible cutting members in planes substantially parallel with the plane of said incisor.

24. In a pitting machine the combination of: a supporting structure; an incisor mounted on said supporting structure; a carriage movably mounted on said supporting structure; a pitting center arranged to impale a fruit upon said incisor; oppositely disposed toggle arms pivotally mounted on said carriage in the plane of said incisor, said toggle arms being provided with slots adapted to receive flexible cutting members; flexible cutting members in said slots; means for moving said flexible cutting members in planes substantially parallel with the plane of said incisor and resilient means for yieldably holding said toggle arms in distended relation with each other.

25. In a pitting machine, the combination of: a longitudinal supporting structure; an incisor head mounted transversely on said supporting structure; an incisor mounted on said incisor head; inwardly extending and downwardly sloping toggle arm guide members formed on said incisor head; a carriage reciprocably mounted on said supporting structure; toggle arms pivotally mounted in said carriage and provided with engaging faces adapted to engage said toggle arm guide members; flexible cutting members mounted in said toggle arms adapted to be moved by said carriage in planes substantially parallel with the plane of said incisor.

26. In a pitting machine, the combination of: a supporting structure; an incisor mounted on said supporting structure; a carriage reciprocably mounted in said supporting structure; a pitting center movable by said carriage and adapted to impale a fruit upon said incisor; a tipping blade pivotally mounted upon said frame and having a tip receiving recess in one end thereof; and cam means for imparting a fruit tipping movement to said blade.

27. In a pitting machine, the combination of: a supporting structure; an incisor mounted on said supporting structure; a carriage reciprocably mounted in said supporting structure; a pitting center movable by said carriage and adapted to impale a fruit upon said incisor; a tipping blade shaft rotatably mounted upon said frame; a tipping blade mounted upon said shaft; a cam mounted on said shaft; and a cam rod mounted on said carriage adapted to impart rotation to said cam.

28. In a peach pitting machine, the combination of: a supporting structure; an incisor mounted on said supporting structure, said incisor having a pit receiving recess therein; a tipping blade having a tipping aperture in one end thereof; and means for imparting a transverse movement to said blade relative to said fruit.

29. In a peach pitting machine, the combination of: a supporting structure; an incisor frame mounted on said supporting structure; an incisor mounted on said frame having a pit receiving recess therein; means for forcing a fruit upon said incisor with the pit in said recess; means for removing the meat from said fruit; and means for ejecting the pit from said recess embodying a shaft member mounted on said incisor frame, a coil spring on said shaft having an outer end provided with a pit engaging member and moving means at the inner end of said spring comprising a pawl reciprocable in a recess in said frame, a movable rod having a pawl engaging shoulder movable transversely relative to said pawl, and means for moving said rod.

30. In a pitting machine, the combination of: an incisor; a reciprocable pitting center head adapted to impale a fruit upon said incisor; flexible severers adapted to be forced through said fruit; and guide means on said center head for guiding said severers about a pit in said fruit.

31. In a pitting machine, the combination of: an incisor; a reciprocable pitting center head adapted to impale a fruit upon said incisor; flexible severers adapted to be forced through said fruit; and guide means comprising wires mounted on said center head and adapted to partially encircle the pit in a fruit engaged thereby for guilding said severers about said pit.

32. In a pitting machine, the combination of: an incisor; a reciprocable pitting center head adapted to impale a fruit upon said incisor; flexible severers adapted to be forced through said fruit; guide plates cooperating with said incisor for directing said severers through the central portion of one end of said fruit; and guide means for guiding said severers about the pit in said fruit.

33. In a pitting machine, the combination of: an incisor; a reciprocable pitting center head adapted to impale a fruit upon said incisor; flexible severers adapted to be forced through said fruit; guide plates cooperating with said incisor for directing said severers through the central portion of one end of said fruit; and guide means comprising wires mounted on said pitting center for guiding said severers about the pit in said fruit.

34. In a pitting machine, the combination of: an incisor; a reciprocable pitting center head adapted to impale a fruit upon said incisor; flexible severers adapted to be forced through said fruit; guide plates cooperating with said incisor for directing said severers through the central portion of one end of said fruit; guide means for guiding said severers about the pit in said fruit, and spacer plates adapted to hold said severers in spaced relation with each other prior to their engagement with a fruit.

35. In a machine for halving drupaceous fruits, the combination of: means for supporting a fruit; a severing wire; means for drawing said wire through a fruit engaged by said supporting means, said wire being mounted on oppositely disposed reels; and means for imparting a uniform advance to said wire on said reels after each fruit cutting movement thereof, said last mentioned means comprising a governor actuated by the roll of wire on one of said reels.

GEORGE WILCOX.